April 3, 1962    J. J. MURPHY    3,027,626
METHOD OF MAKING A SINTERED POLYAMIDE
RESIN BALL BEARING RETAINER
Filed July 9, 1958
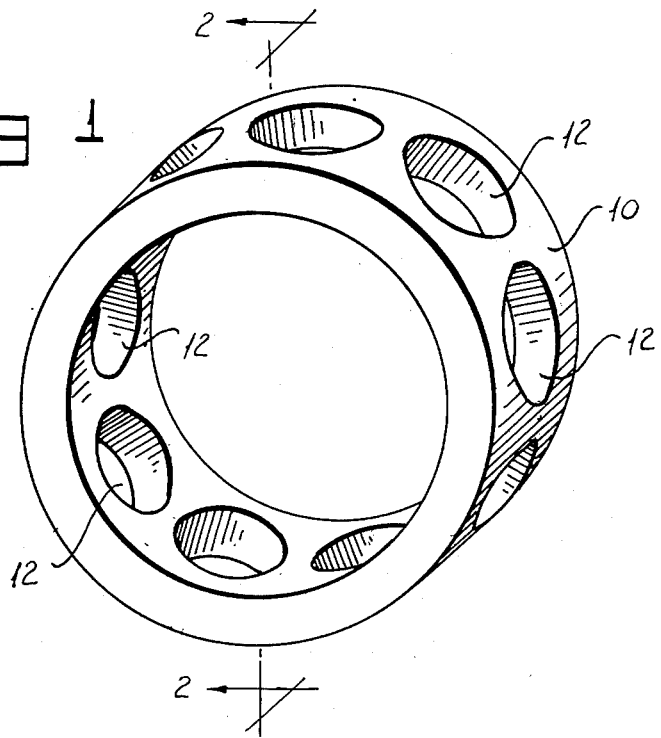
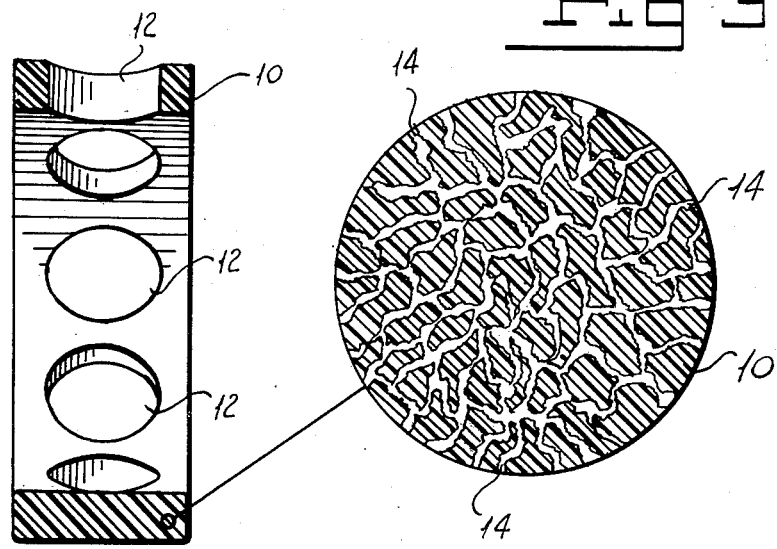
INVENTOR
JOHN J MURPHY
BY
ATTORNEY 3,027,626
METHOD OF MAKING A SINTERED POLYAMIDE RESIN BALL BEARING RETAINER
John J. Murphy, Danbury, Conn., assignor to The Barden Corporation, Danbury, Conn., a corporation of Connecticut
Filed July 9, 1958, Ser. No. 747,398
3 Claims. (Cl. 29—148.4)

My invention relates to a sintered polyamine resin, ball bearing retainer and more particularly to a method of making a porous, nylon, ball bearing retainer ring adapted to absorb and retain a lubricant for ball bearings under extremely high accelerations.

The guidance systems of pilotless aircraft, guided missiles and ballistic missiles depend on inertial components such as gyroscopes. The accuracy of the flight of such missiles, it will be clear, is governed by the accuracy of their gyroscopes and more particularly their precession rates. These, in turn, depend on the bearing friction of the gyroscope bearings. The elimination of friction requires a lubricant. Many efforts have been made to lubricate the ball bearings of gyroscope gimbal rings and gyroscope rotors. The presence of excess free lubricant can promote mass shift which introduces precessional errors. It has been attempted to solve this problem by using solid lubricants such as molybdenum disulfide, graphite or light greases. None of these lubricating methods have been satisfactory since in all cases under rotation of the gyroscope rotor there has been mass shift of the lubricant and the introduction of excessive precessional errors.

It has been attempted to control the shift of the lubricant by the use of laminates formed of phenol condensation products, the lubricant being positioned between the laminates. It has been found that there has been insufficient lubrication of the bearings with the laminates owing to the fact that there has not been sufficient oil retained and fed to the friction surfaces. Insufficient lubrication results in destruction of the bearings and of the gyroscope with which they are used.

The term "nylon" will be used in this specification to indicate a group of synthetic plastics which are long-chain, polymeric amides in which the amide groups form an integral part of the main polymer chain, and which have the characteristic that when formed into a filament the structural elements are oriented in the direction of the axis. Nylon is produced by the reaction of adipic acid and hexamethylene diamine. It has a high softening point in the vicinity of 450° F. and great strength. There are other nylons, such as polyhexamethylene sebacamide, as is well known to the art.

It has been proposed to use virgin nylon as the material from which to machine bearings, gears and other machine parts. This process involves expense and waste. Injection molding techniques require complicated and expensive apparatus and high cost molds. Then too, injection molded shapes contain inherent strains.

Louis L. Stott has invented a method of making shaped articles of nylon, described in United States Patent 2,695,425, dated November 30, 1954. He precipitates nylon in the form of powder having a particle size of less than 40 microns and preferably below 10 microns. This powder is then compressed to the desired shape under pressures in excess of 10 tons per square inch, preferably in the vicinity of 25 tons per square inch. The compressed article is thereafter heated to a temperature sufficient to sinter the particles of nylon, thereby to coalesce them without inducing any substantial molten phase.

I have discovered that the sintered material of Stott can be manufactured to have voids between 5% by volume and 35% by volume, depending on the average particle size of the precipitated nylon particles and the pressures employed in forming the material. It will be clear to those skilled in the art that if large particles in the vicinity of 40 microns are compressed by a pressure of 10 tons per square inch, a material will be formed having a larger percentage of voids than if nylon particles of an average diameter of 10 microns were compressed with a pressure of 50 tons per square inch. In forming a precipitated, sintered, nylon material I am enabled to control the percentage of voids by controlling the particle size and the pressure with which the precipitated nylon is compressed.

Examination of a section of the sintered nylon shows that the voids exist in the form of connecting channels.

I have discovered that oil may be distributed through the interstices or channels of the sintered nylon and be retained therein in ample quantities under rigorous test conditions. I have also discovered that a ball bearing retainer ring may be machined of sintered nylon and treated to cause it to absorb oil. Such an oil-impregnated, sintered nylon, ball bearing retainer may be used to lubricate gyroscope bearings over long periods of time owing to the fact that the oil appears to wick out while resisting being centrifuged out.

One object of my invention is to provide a sintered polyamide resin, ball bearing retainer which is porous in nature and which is adapted to be impregnated with a lubricant.

Another object of my invention is to provide an oil-impregnated, porous, sintered polyamide resin, ball bearing retainer.

Another object of my invention is to provide a method of manufacturing a porous, sintered nylon, ball bearing retainer.

Other and further objects of my invention will appear from the following description.

In the accompanying drawings which form part of the instant specification and which are to be read in conjunction therewith and in which like reference numerals are used to indicate like parts in the various views:

FIGURE 1 is a perspective view of a sintered nylon, ball bearing retainer containing one embodiment of my invention and drawn on an enlarged scale.

FIGURE 2 is a sectional view taken along the plane 2—2 of FIGURE 1.

FIGURE 3 is a view of a small section of my sintered nylon retainer magnified about 500 diameters, showing the channels in the sintered nylon.

In general, my invention contemplates the formation of sintered nylon in accordance with Stott Patent 2,695,425 to form the basic starting material. The Stott process is so controlled as to produce a sintered nylon having between 5% and 35% voids by volume, preferably 20% by volume of voids. This material is then machined to form a ring. The ring is then bored with holes to embrace the balls of the bearing with which it is to be used.

To impregnate the ring with oil I subject the finished ring to a vacuum of 29 inches for about one-half hour. This produces a partial vacuum throughout the interstices or channels of the sintered nylon ring. I then immerse the ring into a lubricating oil and leave it there for about one-half hour. Alternatively, I may immerse the machined ring into a lubricating oil and subject the surface of the oil to a vacuum for a period of about two hours.

The finished oil-impregnated, porous, sintered nylon, ball bearing retainer may be assembled in a ball bearing and the oil will be retained under extreme conditions of 400 times the acceleration of gravity for a period of five minutes. The oil will be released by capillary action to keep the bearing lubricated over long periods of time.

More particularly, referring now to the drawings, a porous, sintered nylon resin material is formed in accordance with the method of Stott Patent 2,695,425. The formation of the material per se does not form part of my invention. It is sufficient that the material be of a porous, sintered polyamide resin and have voids between 5% and 35%, preferably 20%, by volume.

I first bore the material in the form of a tube having an internal diameter equal to the internal diameter of the desired ball bearing retainer. I next machine the tube to the outside diameter of the desired ball bearing retainer. These machining operations must be conducted at high speeds. For example, a tube having an external diameter of one inch preferably should be machined at about 1200 revolutions per minute. The cutting tool should be provided with a negative rake and must be very sharp. If the speed of machining is too low or the cutting tool is too dull or a negative rake is not used, the cuttings will tend to pile up and deflect the tool. The bushing thus formed is then cut to form a blank ring. Holes of sufficient size to embrace the balls of the bearing with which the ring is to be assembled are then bored symmetrically about the ring. The holes are then deburred and the retainer ring may then be lightly polished to make sure that all burrs are removed. The ring will then have the appearance of FIGURE 1 of the drawings in which the ring is indicated by the reference numeral 10 and the ball embracing openings are shown at 12. The sintered nylon will have a plurality of channels 14 into which oil is adapted to flow and be retained when the ring is impregnated with oil. After polishing, the ring is in condition to be impregnated with oil. The ring may be subjected to a vacuum of 29 inches for a period of about one-half hour and then immersed into the lubricating oil. This should be one having a level viscosity index and a viscosity in the vicinity of 40 SAE. Any desired lubricating oil may be employed. If the viscosity is too high, the oil will not flow readily and if the viscosity is too low, the oil will be displaced too easily under high accelerations. I have found that a viscosity in the vicinity of 40 SAE with a sintered material having 20% voids is admirable. With a greater percentage of voids a heavier oil having a viscosity in the neighborhood of 50 SAE may be employed. With a smaller percentage of voids a lighter oil having a viscosity in the neighborhood of 30 SAE may be employed.

Another mode of impregnating the sintered nylon, ball retainer for ball bearings is to immerse the machined ring into an oil and subject it to a vacuum for about two hours. The reduced pressure will draw the entrapped or entrained air from the interstices of the material and permit oil to move into the channels through capillary action. It appears to be the surface tension between the oil and the channels which retains the oil in place.

It will be seen that I have accomplished the objects of my invention. I have provided a sintered, polyamide resin ball bearing retainer which is porous in nature and which is adapted to be impregnated with a lubricant. In this manner I provide an oil-impregnated, porous, sintered polyamide resin ball bearing retainer which is adapted to retain lubricant under exceedingly high acceleration forces. I have provided a method of manufacturing an oil-impregnated, porous, sintered nylon ball bearing retainer.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A method of making a ball bearing retainer including the steps of boring porous, sintered polyamide resin to form a tube having an internal diameter corresponding to the internal diameter of the desired ball bearing retainer, machining the exterior of said tube to the exterior diameter of the desired ball bearing retainer to form a bushing, cutting the bushing thus formed to form a blank ring having a width equal to the desired ball bearing retainer, boring holes in which the balls to be retained are adapted to seat symmetrically about the ring and then impregnating the porous material of the ring with a lubricating oil.

2. A method as in claim 1 in which said oil impregnating step includes subjecting the ring to reduced pressure and then immersing the ring into a lubricating oil.

3. A method as in claim 1 in which the step of impregnating the ring comprises immersing the ring into an oil bath and subjecting the bath to reduced pressure.

References Cited in the file of this patent

UNITED STATES PATENTS

| | | |
|---|---|---|
| 2,126,912 | Murden | Aug. 16, 1938 |
| 2,222,251 | Calkins | Nov. 19, 1940 |
| 2,327,237 | Baden | Aug. 17, 1943 |
| 2,409,236 | Banker | Oct. 15, 1946 |
| 2,578,743 | Rosenthal | Dec. 18, 1951 |
| 2,611,750 | White | Sept. 23, 1952 |
| 2,665,958 | Waldherr | Jan. 12, 1954 |
| 2,695,425 | Stott | Nov. 30, 1954 |
| 2,861,849 | Case | Nov. 25, 1958 |